June 19, 1923.
J. H. MATHESON
1,459,595
APPARATUS FOR MAKING LAPWELDED TUBES
Filed July 14, 1921
2 Sheets-Sheet 1
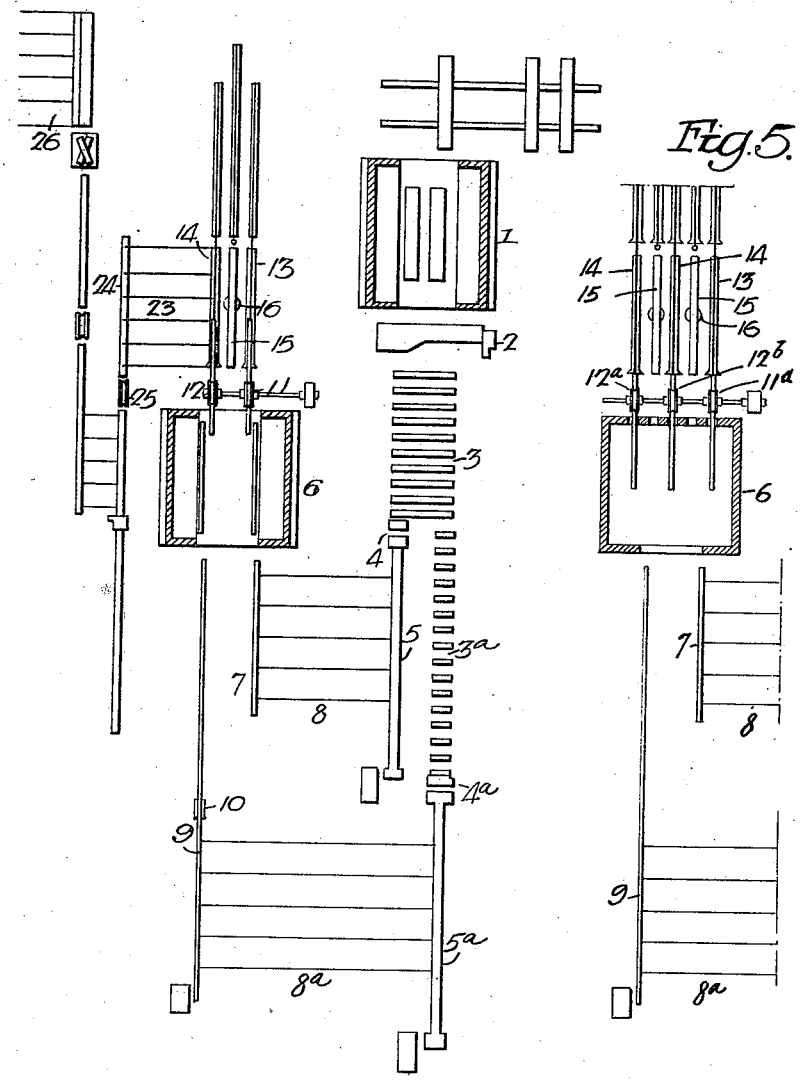

June 19, 1923.

J. H. MATHESON 1,459,595

APPARATUS FOR MAKING LAPWELDED TUBES

Filed July 14, 1921

Inventor-
James H. Matheson
by his Attorneys-
Howson & Howson

Patented June 19, 1923.

1,459,595

UNITED STATES PATENT OFFICE.

JAMES H. MATHESON, OF READING, PENNSYLVANIA.

APPARATUS FOR MAKING LAPWELDED TUBES.

Application filed July 14, 1921. Serial No. 484,716.

*To all whom it may concern:*

Be it known that I, JAMES H. MATHESON, a citizen of the United States, residing in Reading, Berks County, Pennsylvania, have invented certain Improvements in Apparatus for Making Lapwelded Tubes, of which the following is a specification.

The object of my invention is to improve the construction of apparatus for making lap welded tubes so that the apparatus can be used for welding two tubes at substantially the same time, or can be used for making a double weld in a single series of tubes.

This object I attain in the following manner, reference being had to the accompanying drawings, in which:

Fig. 1 is a plan view illustrating my improved apparatus in diagram;

Fig. 5 is a diagrammatic plan view showing three sets of welding rolls at the furnace.

Figure 3:
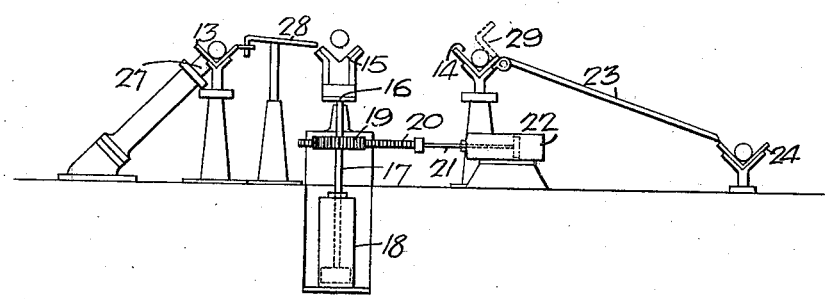
Fig. 3 is a transverse sectional view showing three troughs and the means for transferring the tube skelps when a double weld is made.

Referring to the drawings, 1 is the heating furnace. 2 is the scarfing mechanism. 3 is a roller table to receive the plates after being scarfed. 4 is a bending die at the roller table 3. 5 is a table which receives the bent skelps. 3ª is an extension of the roller table and at the end of this extension is another bending die 4ª. The bent skelp passes through this die and onto a table 5ª. 6 is a heating furnace in which the skelps are heated prior to being welded. 7 is a trough at the rear of the heating furnace and connected to the table 5 by ways 8. 9 is a trough connected to the table 5ª by ways 8ª. The ways 8ª are a distance from the furnace and driving rolls may be provided, as at 10, for driving the skelp, which is delivered onto the trough 9, towards the furnace 6.

At the opposite end of the furnace are two pairs of welding rolls 11 and 12. Beyond the rolls 11 is a receiving trough 13 and beyond the rolls 12 is a receiving trough 14. The usual balls are provided on which the tubes are welded.

15 is a central trough, which is pivoted at 16, and means is provided for raising the central trough so that it can be turned end for end when it is desired to make a double weld. This mechanism is clearly shown in Fig. 3, which illustrates a plunger 17, which carries the trough 15 and a cylinder 18 in which the plunger is located. On the plunger 17 is a pinion 19 meshing with a rack 20 on the plunger 21 of a cylinder 22. This is one of the well known means of elevating and turning troughs of this character. 23 are ways leading from the trough 14 to a trough 24. From this trough a tube is passed through the sizing rolls 25 and the tube finally passes to the cooling table 26.

When it is desired to make a double weld in a tube, then the second die 4ª and the trough 9 are cut out, and all of the tubes pass through the first bending die and onto the trough 7. A tube is passed from the trough 7 into the furnace 6 and is properly heated and passed between the welding rolls 11 onto the trough 13 and is transferred from this trough by a hydraulically operated plunger 27 onto inclined ways, or guides, 28 and onto the trough 15. The tube may re-enter the furnace from this trough without turning, but it is preferable to turn the trough with the tube. Therefore, the trough is raised clear of the other mechanism and is turned end for end and the tube is again inserted in the furnace, after which it is passed between the welding rolls 12 and onto the trough 14. From the trough 14 it is elevated by a pivoted discharge device 29 onto the inclined ways 23, where it is discharged onto the trough 24.

Figure 4:
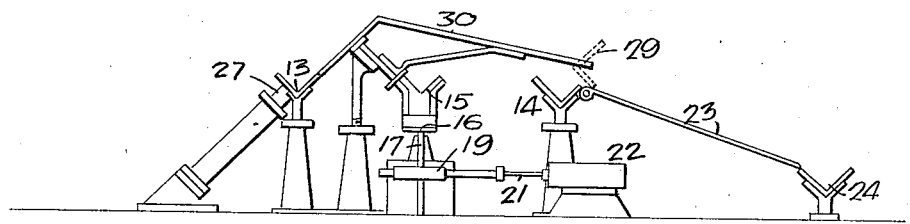
Fig. 4 is a view showing the arrangement of the troughs and the guides when two tubes are passed through the apparatus to receive a single weld.

When it is desired to make a tube having a single weld, then both bending dies are used and two sets of tubes are fed into the furnace 6. One set of tubes passes between the welding rolls 11 and the other between the welding rolls 12. In this instance, the guide 30, Fig. 4, is used, as shown, and the tube in the trough 13 is pushed by the plunger 27 up onto the inclined guide 30 and is rolled down the guide over the trough 14 onto the ways 23, while the other tube, which is projected directly onto the trough 14, is delivered by the device 29 onto the ways 23.

By the above arrangement, it will be seen that I can make a double weld on a series of tubes passing through the apparatus, or the capacity of the apparatus can be doubled when only a single weld is required.

Figure 2:
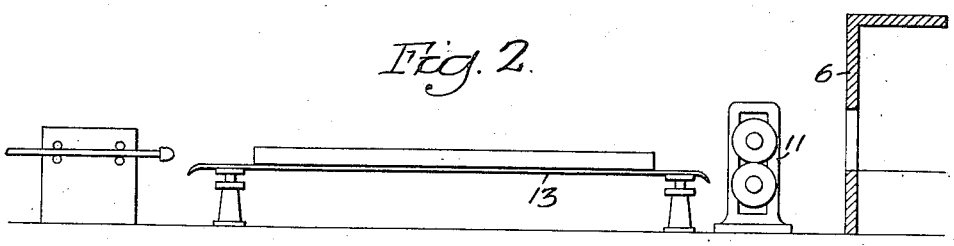
Fig. 2 is a side view showing part of the furnace in section and illustrating the welding rolls and one tube receiving trough.

In Figs. 1 and 2, a furnace is shown in which there are two welding rolls, which can be used for making a single weld pipe, or can be used for double weld tubing by utilizing both rolls.

In Fig. 5, a modification is shown in which there are three welding rolls 11ª, 12ª and 12ᵇ with troughs opposite each roll, and two pivoted troughs between the other troughs so that a double weld tubing can be made, utilizing both runs for the skelp, thus materially increasing the capacity. This particular arrangement of triple rolls is fully described and illustrated in the patent granted to me on the first day of February, 1921, No. 1,367,412.

I claim:

1. The combination in apparatus for making lap welded tubes, of a heating furnace; two sets of welding rolls in front of the furnace; troughs beyond the welding rolls; an intermediate trough; and means, at the rear of the furnace, for feeding two sets of tubes to the furnace to make a single weld on each tube, or to feed one set of tubes to the furnace, using the intermediate trough when a double weld on each tube is desired.

2. The combination in apparatus for making lap welded tubes, of a furnace; two welding rolls in front of the furnace; a trough beyond each welding roll; a trough intermediate said first mentioned troughs; means for turning the intermediate troughs end for end; a primary heating furnace; means, in front of the furnace, for scarfing the blank; a roller table for receiving the scarfed blanks; two bending dies for bending two sets of blanks into the form of skelps; and two troughs at the rear of the first mentioned furnace, one receiving one set of scarf blanks and the other receiving the other set of scarf blanks.

3. The combination in apparatus for making lap welded tubes, of a furnace; a series of welding rolls at the front end of the furnace; two troughs at the rear end of the furnace; a preliminary heating furnace; scarfing mechanism at said furnace; a roller table and an extension of said table; two bending dies, one at the end of the roller table and one at the extension thereof; and a skelp table back of each bending die, one table being opposite one trough and the other table being opposite the other trough at the rear of the first mentioned furnace.

4. The combination in apparatus for making lap welded tubes, of a furnace; welding rolls at one end of the furnace; two troughs for the skelp located at the opposite end of the furnace from the welding rolls, one trough being longer than the other; and means for directing skelp to the two troughs.

5. The combination in apparatus for making lap welded tubes, of a heating furnace; welding rolls at one end of the furnace; two troughs at the opposite end of the furnace arranged side by side, one trough being of a greater length than the other; a roller table having an extension; two bending dies, one die being at the end of the roller table and the other at the end of the extension; and two sets of ways over which the bent skelp is transferred to the trough at the rear of the furnace.

JAMES H. MATHESON.